United States Patent [19]

Miller

[11] Patent Number: 5,331,763
[45] Date of Patent: Jul. 26, 1994

[54] COLLAPSIBLE KING CRAB POT WITH ONE-PIECE NET

[76] Inventor: George R. Miller, 1 Jackson Pl., Durango, Colo. 81301

[21] Appl. No.: 902,655

[22] Filed: Jun. 23, 1992

Related U.S. Application Data

[63] Continuation-in-part of Ser. No. 874,737, Apr. 27, 1992, Pat. No. 5,218,781.

[51] Int. Cl.$^5$ .............................................. A01K 69/00
[52] U.S. Cl. ......................................... 43/100; 43/105
[58] Field of Search ................. 43/100, 102, 103, 104, 43/105, 7, 9.4, 9.5, 9.95

[56] References Cited

U.S. PATENT DOCUMENTS

| | | |
|---|---|---|
| 354,846 | 12/1886 | Walker . |
| 544,100 | 8/1895 | Hurst . |
| 639,628 | 12/1899 | Thomsen et al. . |
| 690,507 | 1/1902 | Zangenberg . |
| 699,084 | 4/1905 | Dill . |
| 786,055 | 3/1905 | Rudiger . |
| 860,506 | 7/1907 | Williams . |
| 878,820 | 2/1908 | Murdoch . |
| 905,263 | 12/1908 | Wing . |
| 1,079,576 | 11/1913 | Noyes . |
| 1,171,924 | 2/1916 | Brown . |
| 1,407,744 | 2/1922 | Ftyklo . |
| 1,425,587 | 8/1922 | Hammond et al. . |
| 1,445,763 | 2/1923 | Gibbs et al. . |
| 1,474,087 | 11/1923 | Prime . |
| 1,927,599 | 9/1933 | Smith . |
| 1,958,724 | 5/1934 | Stanislaw . |
| 1,985,177 | 12/1934 | Lawrence . |
| 2,119,828 | 6/1938 | Nordenstam . |
| 2,516,658 | 7/1950 | Stelly . |
| 2,530,449 | 11/1950 | Bush . |
| 2,552,007 | 5/1951 | Griffith . |
| 2,716,304 | 8/1955 | Taylor . |
| 2,760,297 | 8/1956 | Buyken . |
| 2,769,274 | 11/1956 | Ougland . |
| 2,910,801 | 11/1959 | Safarik et al. . |
| 3,069,803 | 12/1962 | Leakey . |
| 3,184,881 | 5/1965 | Jatzeck . |
| 3,191,338 | 6/1965 | Burgess et al. . |
| 3,209,484 | 10/1965 | Beamer . |
| 3,271,894 | 9/1966 | Manno et al. . |
| 3,319,373 | 5/1967 | Gale et al. . |
| 3,337,982 | 8/1967 | Sajulan . |
| 3,373,523 | 3/1968 | Olafson . |
| 3,678,612 | 7/1972 | Hendrickson . |
| 3,691,667 | 9/1972 | Illinger . |
| 3,786,593 | 1/1974 | Gerbrandt . |
| 3,795,073 | 3/1974 | Olsen . |
| 3,821,861 | 7/1974 | Jalbert . |
| 4,075,779 | 2/1978 | Olafson . |
| 4,156,984 | 6/1979 | Kinser . |
| 4,184,283 | 1/1980 | Wyman . |
| 4,221,071 | 9/1980 | Sjolund . |
| 4,354,325 | 10/1982 | Aho . |
| 4,429,659 | 2/1984 | Holyoak . |
| 4,437,259 | 3/1984 | Holyoak . |
| 4,486,973 | 12/1984 | Faucillon . |
| 4,538,376 | 9/1985 | Morton . |
| 4,565,027 | 1/1986 | Sato . |
| 4,604,823 | 8/1986 | Ponzo . |
| 4,654,997 | 4/1987 | Ponzo . |
| 4,706,409 | 11/1987 | Downing . |
| 4,730,411 | 3/1988 | Katis . |
| 4,843,756 | 7/1989 | Wyman et al. . |
| 4,848,025 | 7/1989 | Wyman et al. . |
| 4,864,770 | 9/1989 | Serio . |
| 4,905,405 | 3/1990 | Hendricks . |
| 4,982,525 | 1/1991 | Miller . |

FOREIGN PATENT DOCUMENTS

553021 5/1923 France .

Primary Examiner—Paula A. Bradley
Assistant Examiner—Chuck Y. Mah
Attorney, Agent, or Firm—Kenton L. Freudenberg; Maxwell C. Freudenberg

[57] ABSTRACT

A collapsible crabpot structure having four generally rectangular side frames, with a V-shaped reinforcing structure extending across each side frame. Hinge structures at each of eight corners of the crabpot structure, each hinge structure having an outwardly located protective structure to prevent impact damage thereon from external impact forces, as well as preventing excess torsional or bending stress on the hinge members of an erect crabpot structure during use. The protective structures are formed at least in part by extensions of primary frame members.

20 Claims, 6 Drawing Sheets

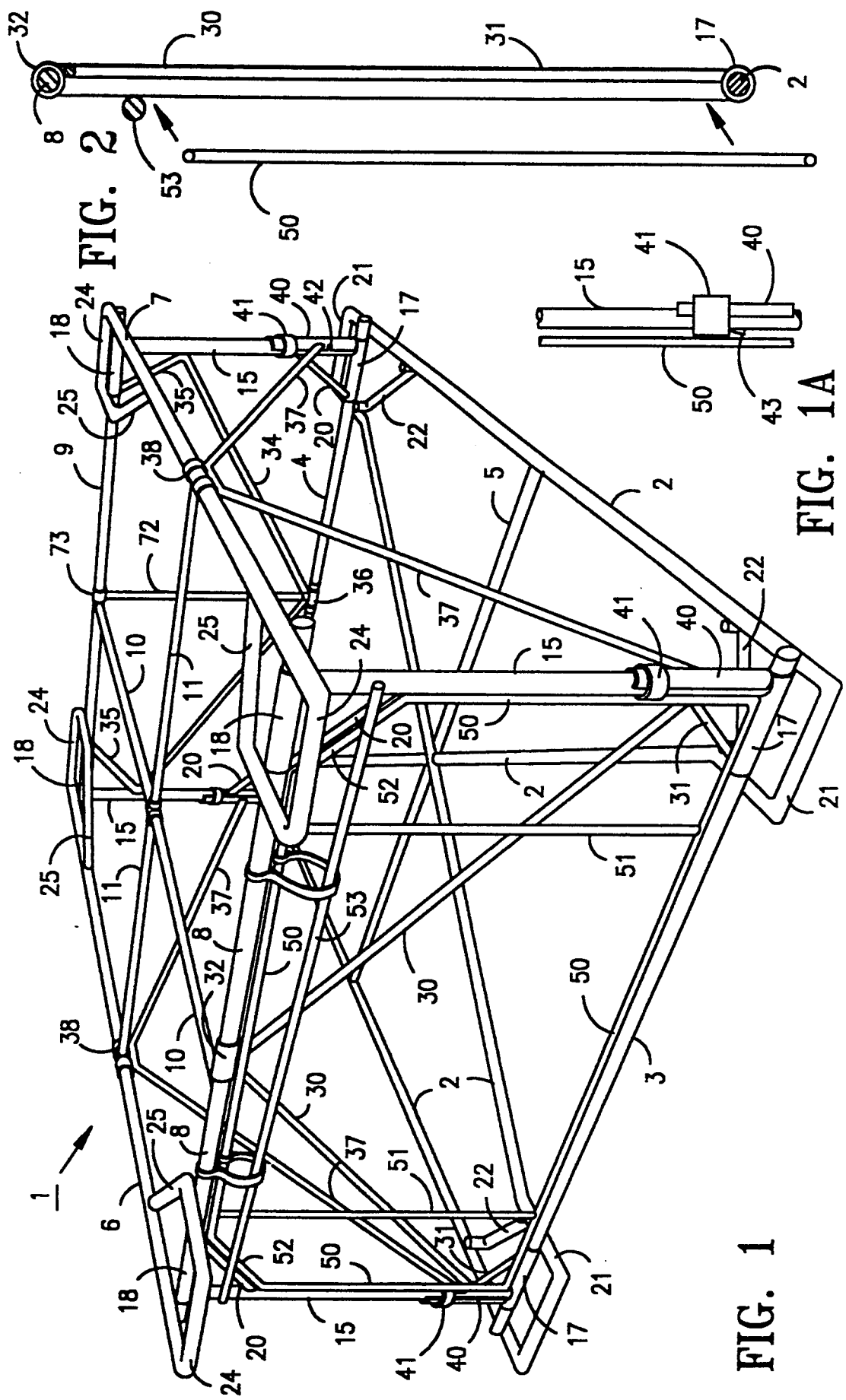

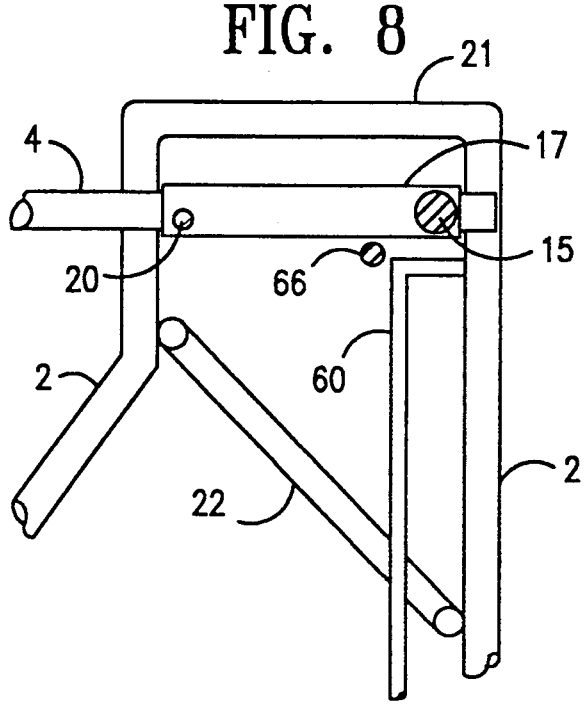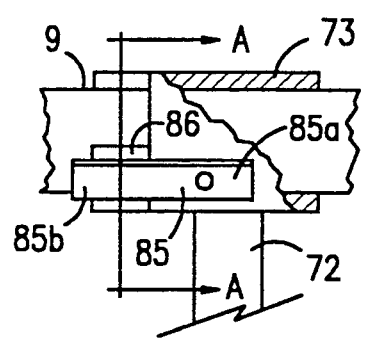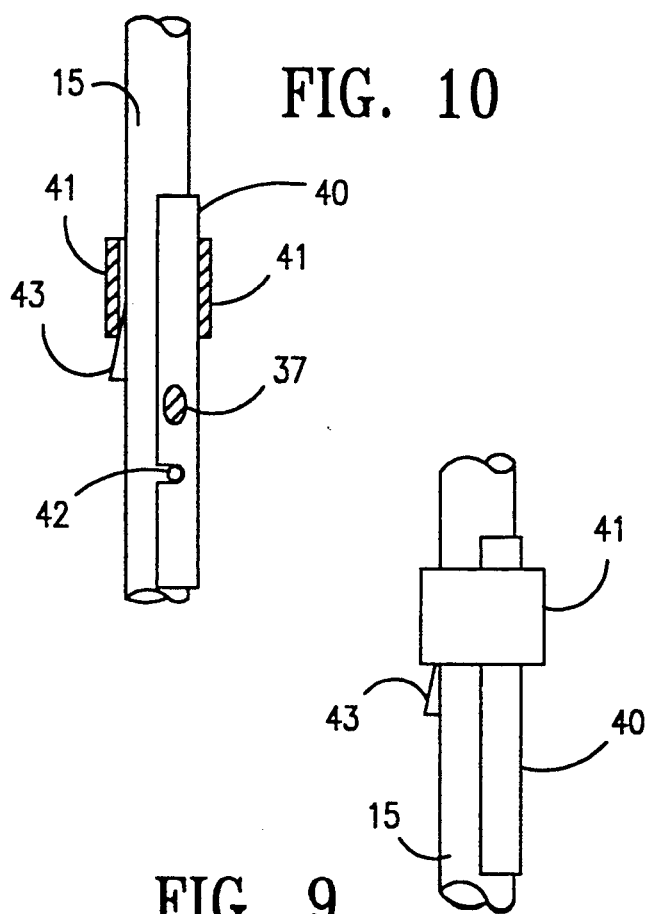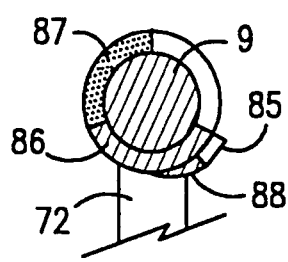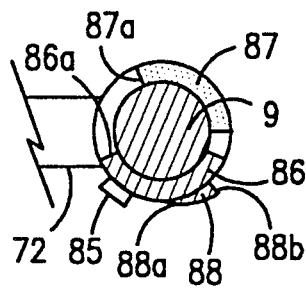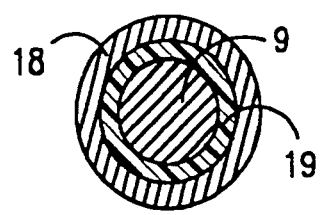

COLLAPSIBLE KING CRAB POT WITH ONE-PIECE NET

This application is a continuation in part of an application Ser. No. 07/874,737, filed Apr. 27, 1992 with the same title, now U.S. Pat. No. 5,218,781, the specification and drawings of which are included herein by reference.

This invention relates to a collapsible frame for a crab pot or trap structure having an easily replaceable unitary or one-piece netting structure secured therein and with modified structure of the crab pot frame structure for improved strength, simplified construction and protection for hinge structures against damage during of the crabpot.

BACKGROUND OF THE INVENTION

King crab pots currently in use weigh about 650 to 700 pounds and have a rigid outer main frame made of $1\frac{1}{4}$ to $1\frac{1}{2}$ inch mild steel bars. The weight is required to hold these pots in place on the sea floor in certain fishing conditions. The outer frame forms a rectangular box, the top and bottom of which are approximately seven feet square, and each side of which is approximately a three by seven foot rectangle. Inside the outer frame is welded a rigid frame of lighter steel bars to which a netting system is lashed. Tunnels which are used by crabs and fish for entrance into the pots are attached to two opposing sides. The pots are lifted by a rope or cable attached to a side perpendicular to the tunnel openings. A door is placed opposite the lifting side so that the catch may be removed from the pot. Although others have recognized that a collapsible pot would have some advantage, no collapsible pot previously devised has proven durable enough to be used in commercial fisheries in the North Pacific Ocean.

SUMMARY AND OBJECTS OF THE INVENTION

Among the objects of the present invention is to enable manufacture of a collapsible pot for use in the King Crab, Tanner Crab, Opelio Crab and Pot Cod fisheries which achieves the following objects or characteristics.

The pot is preferably durable enough to be fished in winter seas in the Bering Sea over an extended period and be able to withstand salt water corrosion, sub-zero temperatures and be suitable for use in strong tidal and other current flows. It must be compatible with on-deck equipment, particularly King Crab pot haulers and pot launchers currently in use.

An object of this invention is to provide a collapsible crab pot frame having relatively movable parts for collapsing and which is simple to manufacture, a strong durable structure, and damage resistant in an undersea environment during heavy seas and in the presence of strong tidal and other current conditions, and which can withstand the likely impacts of substantial force due to contacts with the fishing vessel or other objects while a fully loaded pot is being lifted from the water in heavy seas.

Another object of the present invention is to provide a collapsible crab pot structure which is extremely compact when collapsed and which does not require disassembly and separation of the parts of the crab pot frame in order to permit its manipulation to a collapsed configuration.

Another object of the invention is to simplify the structure of a crabpot frame and to prevent hinge member damage from high impact, torsional or bending forces imposed on the frame during use.

Another object of the invention is to provide a collapsible crab pot having an automatic manually releasable safety latching mechanism to latch the pot frame in its erect configuration during release or securement of the V-brace structures which securely anchor the relatively movable parts to each other in their erect operating configuration.

A further object of the invention is to provide an improved collapsible crab pot which can be stacked in interlocking relationship with other such pots, such stacking being possible for multiple erect pots or for multiple collapsed pots, and in diverse relative positions.

Another object of the invention is to provide a collapsible crab pot structure which has a very compact collapsed configuration and which can be quickly and completely collapsed and stacked with the netting attached.

Pots in accordance with the present invention may be quickly and safely collapsed and stacked at sea, for transportation to and from the fishing grounds. Since a substantially larger number of collapsed pots may be safely transported per trip, time and fuel savings can be realized with their use in this very competitive industry.

The suspension system will also provide flexibility to allow collapse of the pots with netting attached. Separate door netting will permit selection of a mesh size to permit under-limit crabs to escape and may be easily changed to accommodate the size of crab being fished.

DESCRIPTION OF THE DRAWINGS

FIG. 1 is a perspective from the upper right front of a collapsible crab pot frame structure in its erect position, with tie rods omitted.

FIG. 1A is an enlarged view showing the relationship of a door to an adjacent corner post structure of the crabpot.

FIG. 2 is a vertical section showing the relationship between a door and a door frame which removably receives the door.

FIG. 8 is a partial plan view of the lower right rear corner of the frame of FIG. 1.

FIG. 9 is an enlarged view of a locking assembly on the right front post structure of FIG. 1.

FIG. 10 is an enlarged view of a locking assembly on the right rear post structure of FIG. 1.

FIG. 11 is an enlarged rear view at the top rear center of the trap and partially in section, showing details of an automatic frame latching safety arrangement which temporarily holds the trap erect after initial erection until stronger bracing structures are secured between the relatively movable parts of the trap frame.

FIGS. 12 and 13 are sections on line A—A of FIG. 11 and showing relatively movable parts of the frame latching safety arrangement in erect and collapsed positions of the frame, respectively.

FIG. 14 is a section through a tubular hinge on the trap frame showing a plastic sleeve member between relatively movable parts of a hinge structure.

DESCRIPTION OF THE PREFERRED EMBODIMENT

Figure 3:
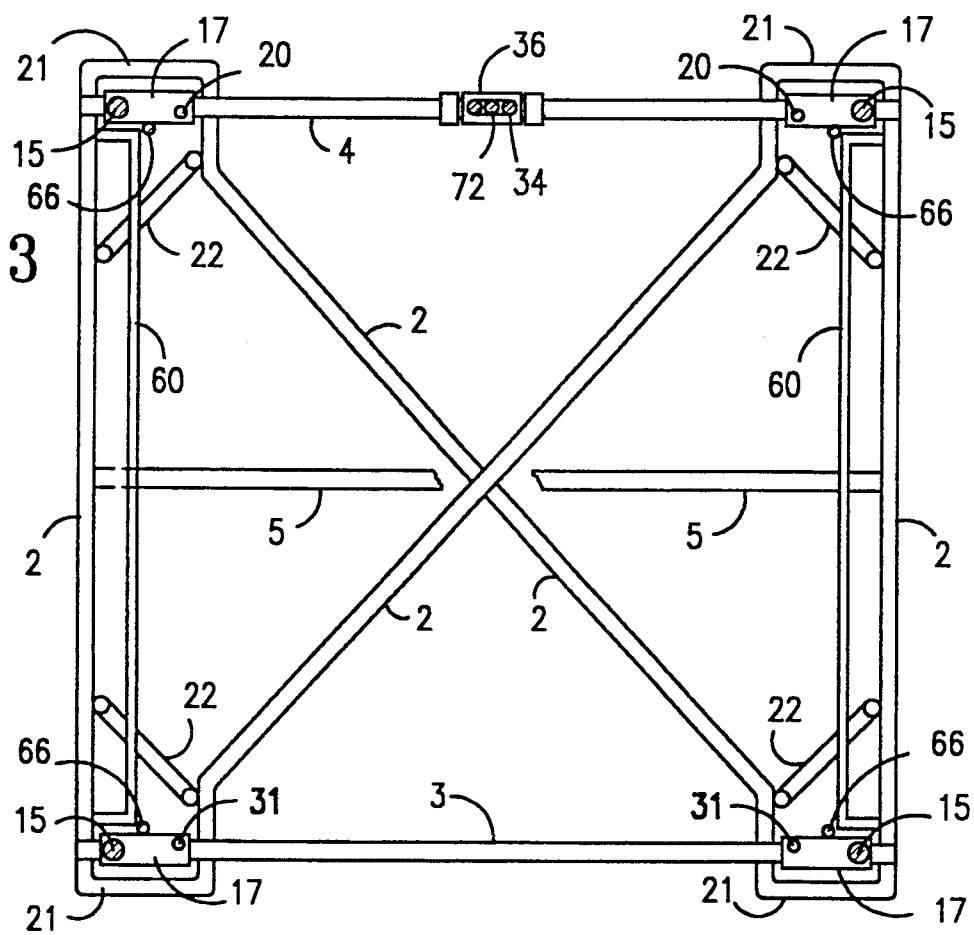
FIG. 3 is a horizontal section looking downwardly from just above the lower frame portion of the trap showing diagonal corner bracing members attached to a lower rectangular frame structure.

FIG. 1 is a perspective view from the upper right front corner of a crab pot or trap frame structure 1 in accordance with the preferred embodiment of the invention and within which will be mounted netting structure in accordance with other features of the preferred embodiment of the invention.

The crabpot frame structure 1 of FIG. 1 comprises a generally square bottom or base frame structure formed by one heavy steel bar 2 bent to form two sides of the square configuration with the bar forming a figure "8" with the ends of the bar meeting the center and being welded thereto to form an "X" shape extending across the center of the bottom frame. The square configuration of the bottom frame is completed by securing transverse heavy steel bars 3 and 4 to the bar 2 at the corners of the bottom frame. However, before welding the ends of the bars 3 and 4 to the bar 2, several tubular structures described herein after as rotatably supported on the bottom frame are appropriately positioned on the bars 3 and 4.

The top of the trap frame structure 1 comprises a second similarly generally square top frame structure having two side bar members 6 and 7 interconnected at the front of the crabpot by a transverse bar member 8 and at the rear of the crabpot by a similar transverse bar member 9. The bars 8 and 9 are welded to the bar members 6 and 7. Again, however, before welding the ends of the bars 8 and 9 to the bars 6 and 7, several tubular structures described herein after as rotatably supported on the top frame are appropriately positioned on the bars 8 and 9. The square upper frame is approximately the same size as the square lower frame and is parallel thereto essentially directly thereabove in the erect position of the trap shown in FIG. 1. The centers of the four sides of the top frame are interconnected by crossed front-to-rear bar 10 and side-to-side bar 11.

The base or bottom frame and the top frame of the crabpot frame structure 1 are interconnected at all corners of the trap frame structure by means of a folding structure including vertically extending corner post structures comprising heavy steel posts or hinged bar members 15. The corner posts 15 are connected at their lower ends at the lower or bottom frame of the crabpot frame structure 1 to steel tubes 17 extending inwardly at the door side and rotatably mounted on hinge bar member portions of the ends of the frame bar 3 and at the lifting side and rotatably mounted on hinge bar member portions of the ends of the frame bar 4. Similar tubes 18 extend inwardly from the upper ends of the posts 15 are also rotatably mounted on hinge bar member portions of the ends of the front and rear top frame bars 8 and 9.

Throughout this specification there are described various tube or sleeve members which are made of steel and rotatably mounted on steel bars forming axles therefor. For anti-friction and corrosion resistance, these relatively rotatable parts may be separated by nylon or plastic sleeves or plastic coatings as seen, for example in FIG. 14, where a high density polyethylene plastic tube 19 separates the parts 9 and 18.

The upper front tubes 18 pivotably mounted on front bar 8 and the lower rear tubes 17 pivotably mounted on the ends of the lower rear bar 4 have their innermost ends connected to the posts 15 by means of inclined corner braces 20.

The tubular sleeves 17 and 18 which form parts of the hinge means which enable the crabpot frame structure to collapse, are provided with protective means in the form of bar structures therearound to prevent them from being damaged when the crabpot hits the seabed or strikes the side of the ship or other apparatus during deploying or retrieving the crabpots during use.

At each of the lower corners of the frame structure 1 the bar 2 is bent with the tubes 17 located within a protective U-shaped bar portion 21, the base of which is parallel to the tube 17 and to the bar 3 or 4. Each end of each bar 3 and 4 is welded to the side bars of the U-shaped bar portions 21 at points just beyond the ends of the respective tube 17. As seen in FIGS. 1, 5–7 and 15–16 these U-shaped parts 21 form protective means which not only extend parallel to and outwardly or transversely beyond the tubes 17 but are also located at a lower level so that both upwardly and transversely inwardly directed impact forces are deflected to prevent damage to the tubular hinge members 17. Further protection at the underside of the crabpot is provided for the members 17 by the corner braces 22 which extend across the ends of the U-shaped portions of bar 2 and depend therefrom as seen in FIGS. 1, 5–7 and 16–17.

Figure 4:
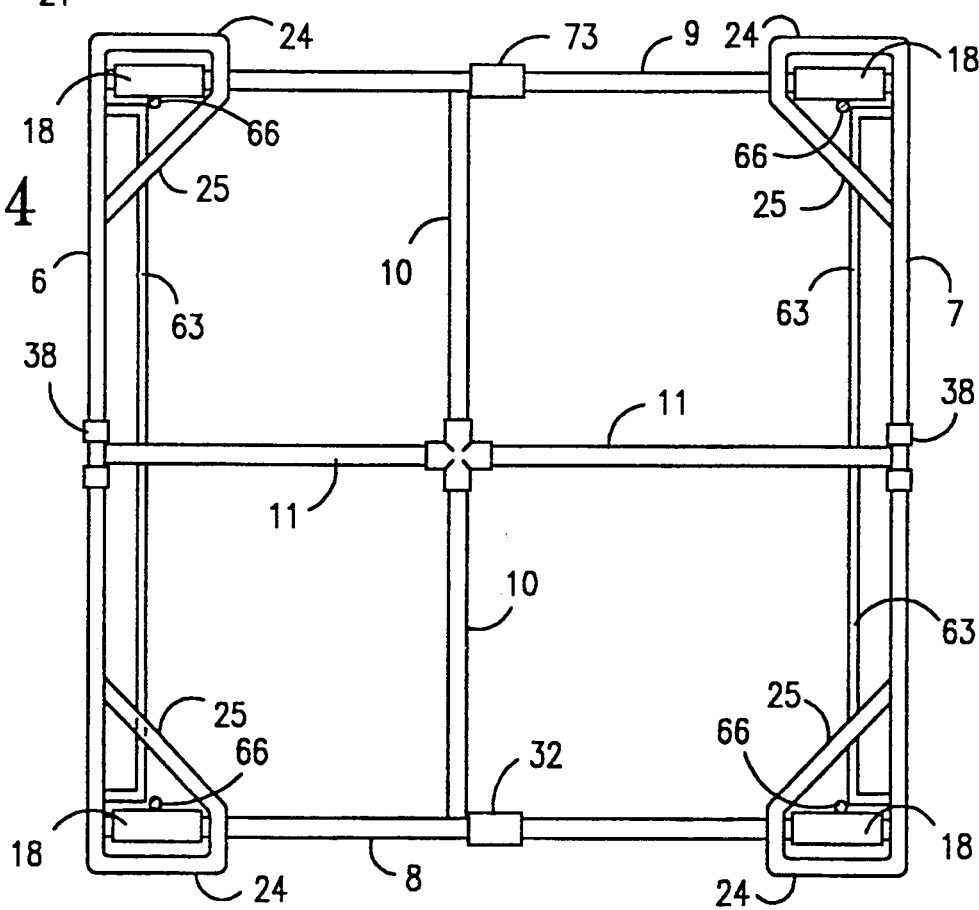
FIG. 4 is a top view of the top frame portion of the crabpot.
Figure 5:
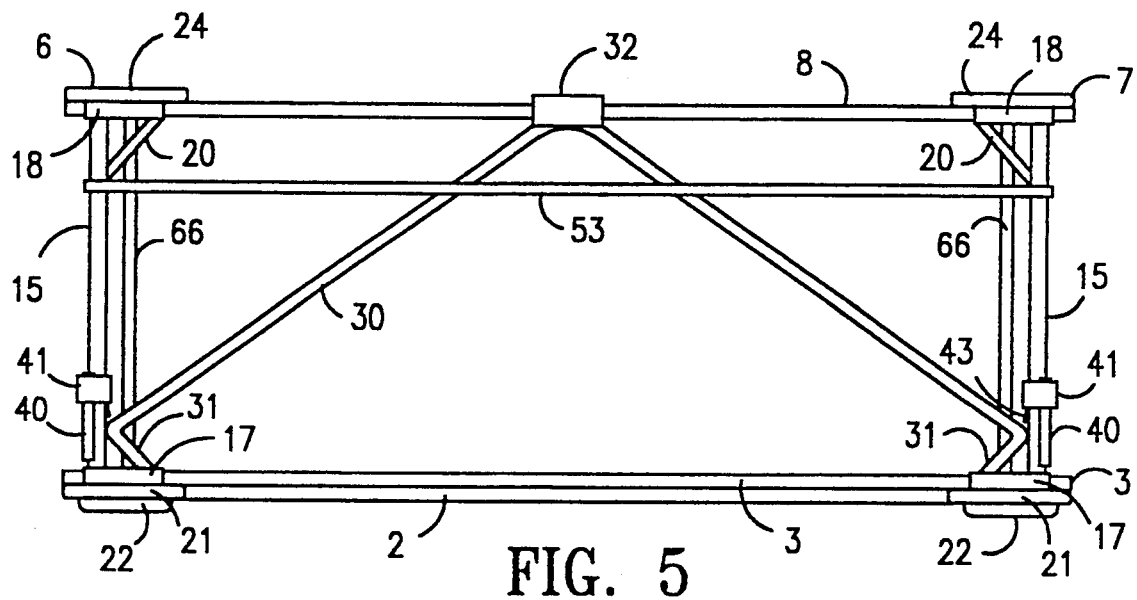
FIG. 5 is a front view of the trap structure of FIG. 1 before mounting a door and the structure of a netting bag therein, but showing part of the tie rods therein for mounting the netting.
Figure 15:
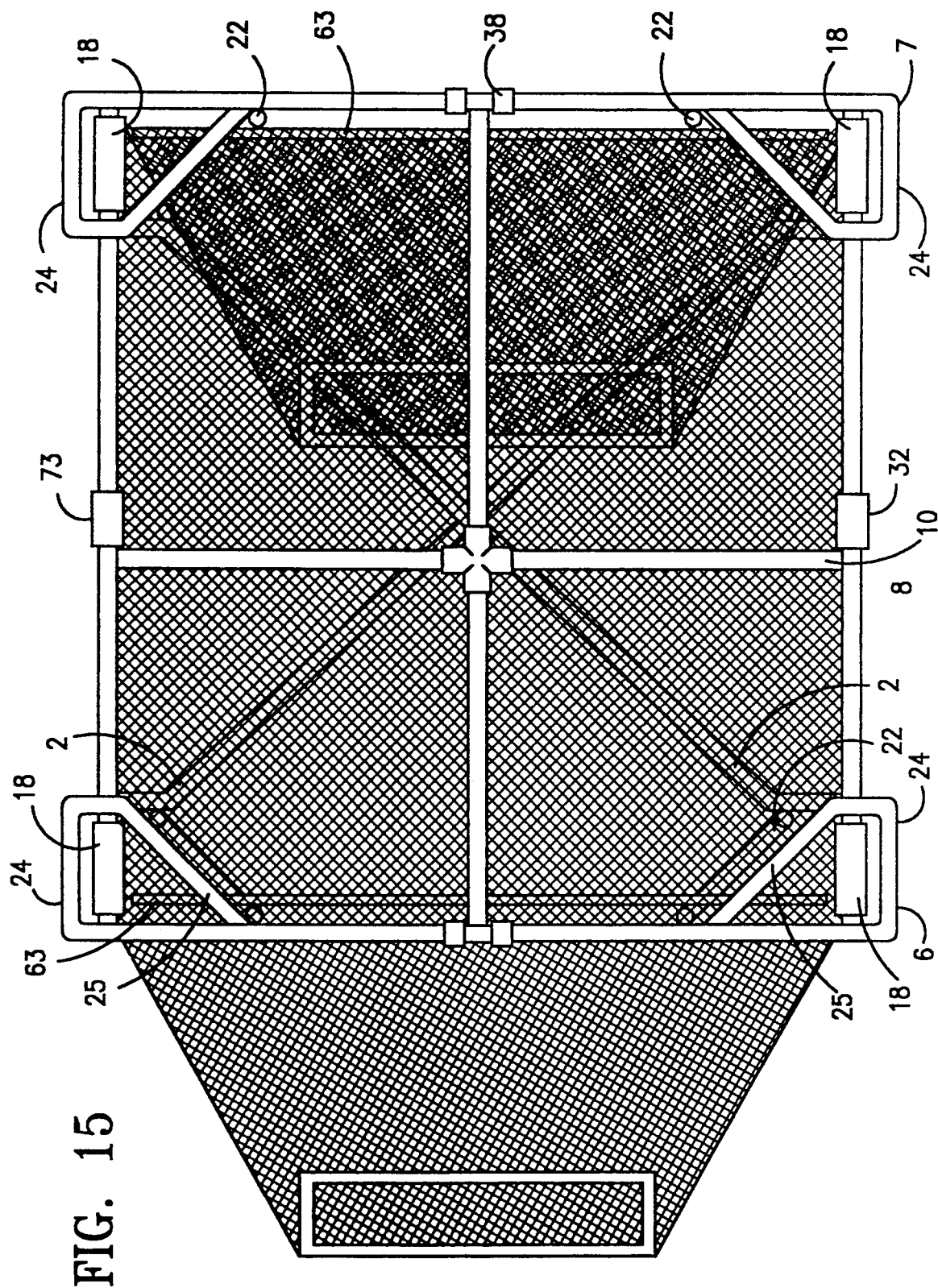
FIG. 15 is a top view of the trap with the trap netting partially in place, one of the netting tunnels being shown in its position before being pushed within the frame for a tensioning connection to the opposite tunnel.
Figures 16, 17:
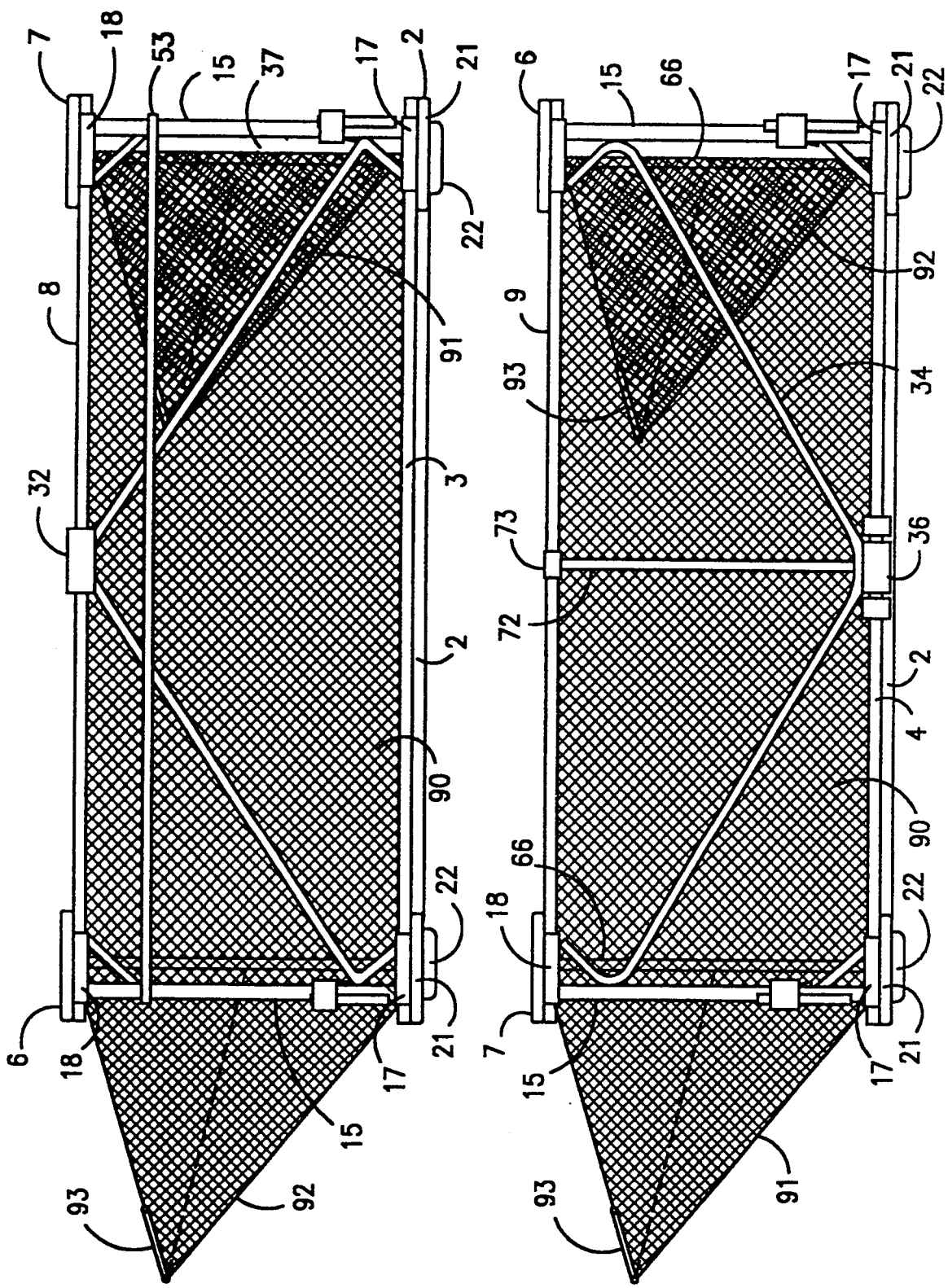
FIG. 16 is a front view like FIG. 5 with the addition of the netting bag structure secured therein without a door or netting on the door.
FIG. 17 is a rear view of the trap frame of FIG. 1 similar to FIG. 6, but with the trap netting partially in place, one of the netting tunnels being shown in its position before being pushed within the frame for a tensioning connection to the opposite tunnel.

At each of the upper corners of the frame structure 1 the bars 6 and 7 are bent to loop back on themselves with the tubes 18 located within a protective U-shaped bar portion 24, the base of which is parallel to and outwardly or transversely beyond and just above the tube 18 and the bar 8 or 9. Each end of each bar 8 and 9 is welded to the side bars of the U-shaped bar portions 24 at points just beyond the ends of the respective tube 18. As seen in FIGS. 1, 5–7 and 15–16 these U-shaped parts 24 form protective means which not only extend outwardly beyond the tubes 17 but are also located at a higher level so that both downwardly and transversely inwardly directed impact forces are deflected to prevent damage to the tubular hinge members 18. Further protection is provided for the members 18 by the corner braces 25 which are end portions of the bars 6 and 7 extending across the ends of the U-shaped portions 24 of bars 6 and 7 as seen in FIGS. 1, 4 and 15.

The door side frame of the crabpot 1 comprising the bars 3 and 8 and the posts 15 and tubes 17 and 18 is reinforced by means of an inverted-V-shape brace support 30 having its central point or apex welded to a tubular sleeve 32 rotatably mounted centrally of the bar 8. The lower ends or knees of the bar 30 are welded to the vertical posts 15. Further reinforcing leg extensions 31 of the bar 30 extend downwardly and inwardly from the knees and are welded to the ends of the tubes 17 at points spaced inwardly from the posts 15.

The lifting side frame of the crabpot 1 comprising the bars 4 and 9 and the posts 15 and tubes 17 and 18 is reinforced by means of an V-shaped brace support 34 having its central point or apex welded to a tubular sleeve 36 rotatably mounted centrally of the bar 8. The outer ends or knees of the bar 34 are welded to the vertical posts 15. Further reinforcing upwardly extending leg extensions 35 of the bar 34 extend inwardly from the knees and are welded to the ends of the tubes 18 at points spaced inwardly from the posts 15.

The tunnel side frames of the crabpot 1 comprising the bars 2, 6 and 7, and the posts 15 are each reinforced by means of an inverted-V brace support 37 having its central point or apex welded to a pairs of tubular sleeve members 38 rotatably mounted centrally of the bars 6 and 7, respectively. Each pair of tubular members 38 closely straddles an end of the transverse top frame bar 11.

The lower ends of the bar 37 have welded thereto vertically extending half-cylinders 40 with the recesses thereof facing toward the centers of the lower portions of the door and lifting frame sides. When the half-cylinders of the bars 37 are released from the vertical posts 15 the bars 37 may be swung outwardly up and atop the top frame of the crabpot to enable the structure to be folded to a collapsed position. After erection of the crabpot structure the bars 37 are moved in reverse and the half-cylinders are moved down to overlie and extend along the lower ends of the posts 15, resting atop the outer ends of the tubes 17. To assist in initially positioning the half-cylinder members 40 on the posts 15, each member 40 has a transverse slot in an edge thereof as seen in FIG. 10 which receives a respective pin 42 extending outwardly from a respective post 15. Each member 40 is essentially concentric with a post 15 and fits closely against one face thereof. Secured to the opposite face of the post is a wedge member 43 which provides a camming action when a slidable locking means in the form of a cylindrical sleeve member 41 encircling the post 15, member 40 and the wedge 43, is driven downwardly by a suitable impact tool (not shown) to tightly secure or anchor the member 40 and bar 37 to the vertical post 15. The impact tool is also required to release the sleeve 41 from its wedged position.

The door structure 50, shown in FIG. 1, is generally rectangular and formed from a steel bar having horizontal top and bottom portions and vertical side portions. The door is reinforced by vertical bars 51 extending between the horizontal top and bottom bars of the door 50.

The bar 30 and its legs 31 are secured to the sleeves 17 and 38 in a rearwardly offset position relative to these sleeves and with respect to the posts 15 as seen in FIG. 2. The front corner braces 20 are in essentially the same plane as the bar 30 and legs 31. Extending across the door side of the crabpot on the outside of the vertical posts 15 is a door retaining bar 53 welded to the posts 15. As seen in FIGS. 1 and 2, when a door is slid upwardly into the space between the bar 53 at the front of the door and the bar 30 and corner braces 20 at the rear of the door, the upper portion of the door is kept from any forward or rearward movement. In this position the bottom of the door may be secured to the lower front frame bar 3 by quick-releasable means such as lashing around both the bottom of the door and bar 3.

As seen in FIGS. 1 and 3 the bottom frame bar 2 is provided with a side-to-side cross members 5, the ends of which are welded to the side portions of the frame 2 and the center being welded to the center X-shaped portion of bar 2.

The lower corner braces 22 shown most clearly in FIGS. 1, 3 and 8 extend at 45 degree angles across the four corners of the lower frame bar 2. Each of these corner braces 22 has upturned ends which are welded to the inside of the base frame bar 2 as seen in FIGS. 1, 3 and 8. The straight horizontal lower portions of the corner braces 22 extend a sufficient distance below the bottom of the frame bar 2 so that these brace members not only provide support for the trap and wear and impact damage protection for the hinge tubes 17 when the crabpot is resting on a flat surface, but they also provide a nesting capability whereby these depending corner brace portions can fit and nest within the similarly angled corner braces 25 of the top frame of another like crabpot structure and keep the frame 2 from sliding off an underlying top frame of another like crabpot structure on which the crabpot is stacked.

The hinging connections between the top and bottom frames of the crabpot structure 1 and the corner posts 15 enable the top frame to be moved with a translatory motion rearwardly and downwardly from the position shown in FIG. 1, through intermediate positions, to a completely collapsed position, where the top frame rests atop a portion of the lower frame. In the preferred embodiment this translatory motion is permitted only by manually unlatching a latching lever 85 seen in FIGS. 11, 12 and 13. This latching lever 85 is shown secured to the upper tube member 73 on the rear vertical support 72 at the right end 85a of the lever 85 as seen in FIG. 11. The left free end 85b of the latch 85 extends beyond the left end of tube 73. As seen in FIGS. 11 and 12, the main bar 9 has a stop lug 86 thereon and welded thereto which has an abutment surface engaged by an edge surface 87 of an arcuate extension of the tube 73 to limit counterclockwise movement of the tube 73 relative to the bar 9. The limiting position when these surfaces engage corresponds to, the erect position of the trap frame structure 1 as in FIG. 1. When the upper frame is moved from its collapsed position to the erect position of FIG. 1, not only are the parts 86 and 87 in engagement, but also the free end of the latching lever 85 passes upwardly on and over a raised camming portion 88 atop the stop lug 86 until, in the erect crabpot position the latching lever drops from atop the portion 88a to engagement behind an abutment surface 88b of the part 88. In dropping behind the surface 88b, the latching lever 85 automatically latches the tube 73 against clockwise movement relative to the bar 9 as seen in FIG. 12. This at least temporarily holds the upper frame from falling from its erect position while other securing means such as V-braces 37 are put in place to rigidize the crabpot frame structure.

For lowering the top frame to its collapsed position after braces 37 are released, the end 85b of the latching lever may be lifted to disengage the lever from the abutment 88b and allow clockwise movement of the tube 73 relative to the main bar 9 and collapse of the crabpot structure. In this position the latch structure parts will be in the respective positions shown in FIG. 13.

To collapse a crab pot having added weight therein, it is necessary to first open the crab pot door and swing the latter to a position atop the top frame. The extra weights are then unfastened and removed. The braces 37 are unfastened by releasing members 40 at their lower ends from the corner posts 15 and swung atop the upper frame. Thereupon, manual release of the spring latch 85 will allow the upper frame to be swung with a translatory motion, i.e. in an arcuate path but only in the direction toward the rear and remaining with its sides parallel to and above the sides of the lower frame 2. A preferred embodiment of a latching means using the same mechanical concept can eliminate the vertical bar 72 and tube 73 by putting the latching mechanism on the upper front support tube 32 of the door side support brace 30, with the lever 85 located at the front face of the tube 32 and holding the tube 32 latched when the crabpot is in its erect position. In the fully collapsed position there is little interference from the netting 90 which can remain within the frame structure and the top frame will move to rest atop the lower frame.

A collapsed pot will be about 4.0 inches high and about 118 inches long. A deck area of about 28 feet by 61 feet will hold 28 collapsed pots and 250 pots can be stacked in such an area in a stack about three feet high. For pots weighing 650 pounds this would be a load of 81.25 tons.

As seen in FIGS. 9, 10 and 10B of application Ser. No. 07/874,737, additional weight can be added to the structure of crabpot 1 by means of railway rail sections or other weights extending transversely over the cross members within the lower frame bar 2 and generally parallel to the sides of the lower frame bar 2. These rails have holes in their base flanged portions through which extend J-bolts having curved portions hooked around the lower sides of the respective cross bars of the bottom frame to secure the rail weights thereto. The rail weights are attached to the cross members after a netting structure is positioned within the crabpot structure 1 and the weights are positioned on the bottom of the net structure a sufficient distance from the sides of the crabpot structure so as not to interfere with tunnel floor and entrances of the netting structure which are described hereinafter and shown in FIGS. 15, 16 and 17.

Such detachable weights can be conveniently moved to the hold of a vessel during bad weather and heavy seas to create a shift of the center of gravity of the vessel and improve its stability under such conditions.

In lieu of the rails an alternative extra weight structure may be made using a tubular plastic or rubber hose container about 8 inches in diameter and five feet long which is filled with a suitable gravel or other aggregate and the ends closed by secured caps, by squeezing and bolting or by any other means. Releasable straps may be used to secure these weight structures to the cross bars of the bottom frame. When transported without the aggregate in the containers, the weight saving is about 75 to 125 pounds per container or about 150 to 250 pounds per crabpot.

Figure 6:
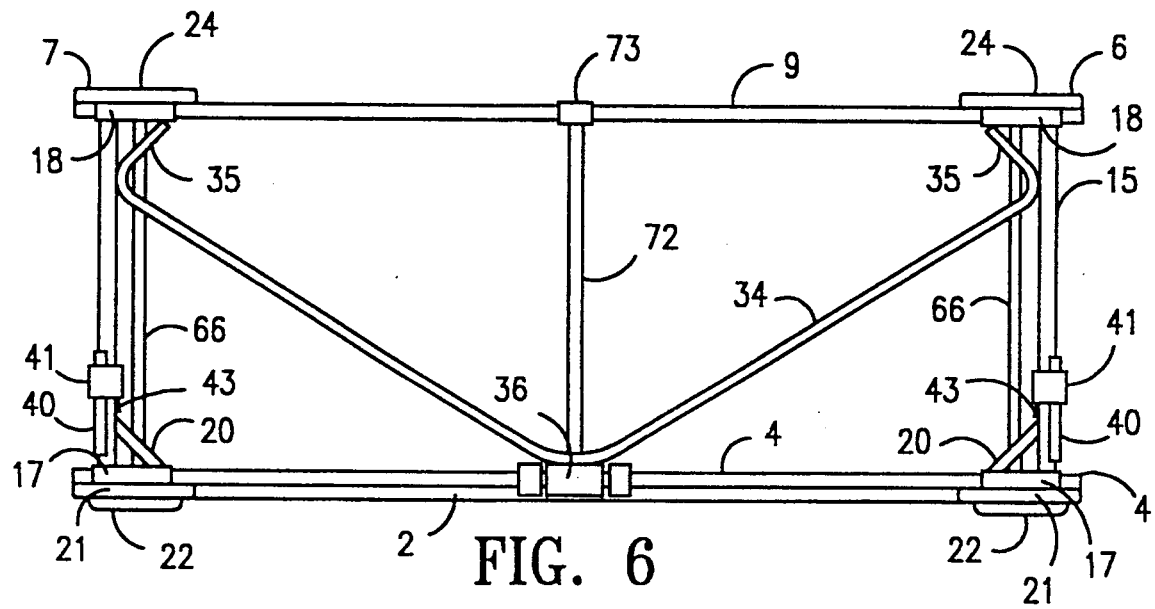
FIG. 6 is a rear view of the trap frame of FIG. 1.
Figure 7:
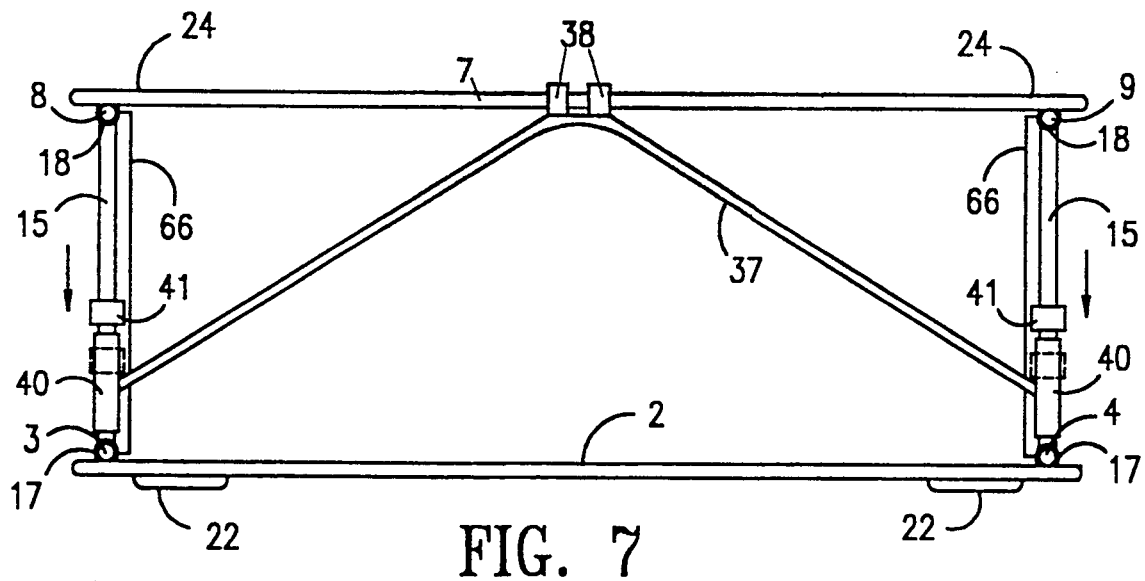
FIG. 7 is a right side view of the frame of FIG. 1 in its erect position and showing one of two swinging inverted V-shaped brace members used to anchor the horizontal main frame members to the vertical corner posts of the frame at opposite sides of the frame.

A unitary net structure 90 is shown in FIGS. 6, 8 and 9, and comprises a top rectangular portion generally coextensive with the inner perimeter of the top frame, a rear rectangular portion generally coextensive with the inner perimeter of the rear or lifting side of the crabpot, and a bottom rectangular portion generally coextensive with the inner perimeter of the base or bottom frame. The net structure 90 also includes right and left end tunnel structures 91 and 92. The entrance openings of these tunnel structures are secured to the top, rear and bottom portions of the netting structure. The front vertical edges of the tunnel openings are secured by tying to vertical tie bars 66 located inside the front corner posts 15 and extending between lower and upper tube members 17 and 18. Rear vertical corners of the netting at the tunnel openings are tied to rear vertical tie bars 66. Netting at the top and bottom corners of the tunnel openings are tied to horizontally extending tie bars 63 and 60, respectively. Tie bars or rods 60 have outwardly extending ends at right angles to their lengths, which ends are welded for support to portions of the lower frame bar 2. The center of each rod 60 is welded to cross bar 5. Tie bars or rods 63 have outwardly extending ends at right angles to their lengths, which ends are welded for support to portions of the upper frame bars 6 and 7. The center of each rod 63 is welded to cross bar 11. The horizontal edges of the netting at the door side are tied to the upper bar 8 and lower bar 3, respectively. The upper and lower corners of the rear side of the netting are tied to the upper bar 9 and lower bar 4, respectively. Tying to the bars 3, 4, 8 and 9 is possible without serious damage to the ties because these bars are protected by being inwardly offset relative to the structures of bars 2, 6 and 7.

The crabpot structure as seen in FIG. 1 may be used with the additional tie rods 60, 63 and 66, or it may also be used with the various means for securing a netting structure therein as described in connection with FIGS. 11, 12 and 13 of application Ser. No. 07/874,737.

The tunnel structures 91 and 92 are convergent from their generally rectangular entrance openings to a restricted opening into the interior of the crabpot structure 1. These openings are near the center of the crabpot and are defined by a rectangular hoop 93 for the right tunnel, the hoop opening generally upwardly near the center of the crabpot. A similar hoop 93 is provided for the left tunnel. These hoops 93 are tied or otherwise secured to the tunnel netting structure and lines are connected to opposite ends of the innermost elongated side bars of the hoops 93 to pull them towards each other at the center of the crabpot.

The present invention contemplates that the one-piece netting may be made in several ways to form the top rear and bottom and tunnel portions of a unitary netting structure as a single unit which can be marketed by itself for replacement of net structures in presently manufactured crabpots or which can be secured in the frame structure of FIG. 1 as described in application Ser. No. 07/874,737 in connection with FIGS. 15, 16 and 17 thereof.

A separate piece of netting may be placed over the inside of the door and have its edges folded around the periphery of the door and secured thereto as shown and described in connection with FIG. 6A of application Ser. No. 07/874,737. In an alternative, the door netting may be merely laced to the door frame 50.

The dimensions and materials of the components of the trap frame structures described above may be as follows for King Crab pots. The lower frame bar 2, corner posts 15 and bottom cross member 5 are 1.375 inches in diameter. Lower cross bars 3 and 4, top frame bars 6 through 11 and corner braces 20 are of 1.125 inches diameter. Door retainer 53 is of 0.875 inches dia. Door 50 bar, tunnel braces 37 and lifting side brace 34 are of 0.75 inches dia. Door frame brace 30 is of 0.625 inches dia. All these parts are of mild steel.

For Dungeness crabs the pots may be made smaller, but the same structural system and arrangement for collapsing the pots and the unitary netting concept described above may be used.

The present invention produces combined benefits for fishermen based on collapsing of crab pots and having removable weights on the crab pots. Making a crab pot collapsible has a very significant effect in increasing the number of pots that can, when collapsed, be safely transported on the deck of a vessel, in comparison to the number that can be safely transported on the deck when the traps are stacked in their erect configuration. This change is directly related to the substantially lower center of gravity for the stack of collapsed pots. For the height reduction achieved with the collapsing capability of the present invention, the increase in number of pots that can be carried is of the order of 30 to 50 percent, depending on the characteristics of the particular vessel.

Removing any auxiliary or extra weights from the pots on the deck has a similar effect of improving the vessel's stability or of increasing the number of pots that can be safely transported. When the removed weights are transferred to a storage location in low areas of the vessel's hull, the overall center of gravity of the vessel and its load is lowered and the vessel's stability is increased. Even though the vessel may travel with such a storage hold filled with sea water, part of the water can be displaced by the steel rail weights, with a resultant lowering of the effective center of gravity of the vessel.

A practical minimum amount of weight to be removed from a pot and stored in a vessel's hold is believed to be about 100 pounds in order to produce a significant shift in the vessel's center of gravity when carrying a large number of pots. For a weighted pot having a total weight of 700 pounds, removable weight totalling 100 pounds would be about 14 percent weight reduction. Of course any percentage higher than this produces increased benefits as far as the shift of center of gravity is concerned. However, the practical upper limit is determined primarily by the requirement for structural integrity of the unweighted pot. Any weight reduction must be achieved without sacrificing the structural integrity of the pot during use.

Other variations within the scope of this invention will be apparent from the described embodiments and it is intended that the present descriptions be illustrative of the inventive features encompassed by the appended claims.

What is claimed is:

1. A collapsible crabpot structure comprising:
    a generally flat bottom frame structure for resting on a seabed, and a generally flat top frame structure, at least one of said bottom and top frame structures including a plurality of parallel hinge bar members,
    said collapsible crabpot having a folding structure means including a plurality of vertical hinged bar members each extending generally perpendicular to one of the hinge bar members of a respective frame structure, hinge means for pivotably connecting each vertical hinged bar member to its respective frame hinge bar member,
    each said hinge means comprising a tube member with the respective hinged bar member being secured thereto, said tube member being rotatably carried by a respective frame bar member, said hinge means being located at outer corners of the respective frame structure,
    a protective means for each said tube member comprising portions of the respective frame structure extending outwardly, transversely beyond and vertically displaced at the side of the respective tube member, to protect the tube member from damage due to inwardly directed impact forces or other deforming forces on the crabpot structure directed transversely toward the tube member during use of the crabpot structure.

2. A collapsible crabpot structure according to claim 1 wherein each said protective means includes two bars generally perpendicular to each other with one bar extending parallel to the tube member outwardly of the tube member, both horizontally and vertically, the other of the two bars extending transversely of the tube member outwardly of the tube member, both horizontally and vertically.

3. A collapsible crabpot structure according to claim 1 wherein each said protective means includes a protective loop structure generally encircling the area of the respective tube member.

4. A collapsible crabpot structure according to claim 1 wherein each said protective means includes three bars, two of said bars extending transversely beyond the opposite ends of the tube member and the third bar extending parallel to the tube member and being located outwardly of the tube member.

5. A collapsible crabpot structure according to claim 4 wherein the three bars of at least two such protective means are portions of a single long bar bent to form at least two corners of the bottom frame structure.

6. A collapsible crabpot structure according to claim 4 wherein the bars of such protective means are portions of a single long bar bent to form four outer corners of the bottom frame structure.

7. A collapsible crabpot structure according to claim 6 wherein said single long bar includes portions extending across the center of the bottom frame structure.

8. A collapsible crabpot structure according to claim 4 including for each protective means one of said parallel hinge bar members secured to the two parallel bar members of the protective means and forming a pivot axle for the respective tube member.

9. A collapsible crabpot structure according to claim 1 having an erect configuration and a collapsed configuration, the structure having in its erect configuration generally square, parallel vertically-spaced top and bottom horizontally extending frame structures with the four respective corners of the top and bottom frames being interconnected by said vertical hinged bar members to form four horizontally elongated generally rectangular vertically-extending side frames of the crabpot structure, said four side frames comprising two tunnel side frames, a door side frame interconnecting said tunnel side frames at one end of the tunnel side frames and a lifting side frame which is parallel to said door side frame and interconnects said tunnel side frames at the other end of the tunnel side frames, said hinge means having hinge axes extending generally perpendicular to said tunnel side frames and pivotably connecting the opposite ends of each of said vertical hinged bar members to corner portions of the top and bottom frames, respectively, to provide translatory swinging movement of the top frame from its erect position downwardly and away from the erect position of said door side frame to a collapsed position adjacent and parallel to the bottom frame, the shape of said tunnel side frames changing from rectangular parallelograms to flattened parallelograms during such translatory movement, said protective means comprising portions of said top and bottom frames to protect said hinge means from external impact forces on the structure directed inwardly of the crabpot structure toward said hinge means and transversely of said axes.

10. A collapsible crabpot structure having an erect configuration and a collapsed configuration, the structure having in its erect configuration generally square, parallel vertically-spaced top and bottom horizontally extending frames with the four respective corners of the top and bottom frames being interconnected by four post structures to form four horizontally elongated generally rectangular vertically-extending side frames of the crabpot structure, said four side frames comprising tunnel side frames; a door side frame interconnecting said tunnel side frames at one end of the tunnel side frames and a lifting side frame which is parallel to said door side frame and interconnects said tunnel side frames at the other end of the tunnel side frames, hinge means pivotably connecting the opposite ends of each post structure to corner portions of the top and bottom frames, respectively, to provide translatory winging movement of the top frame from its erect position downwardly and away from the erect position of said door side frame to a position adjacent and parallel to the bottom frame, the shape of said tunnel side frames changing from rectangular parallelograms to flattened parallelograms during such translatory movement as the crabpot structure assumes a collapsed configuration, said tunnel side frames each including diagonally extending releasable bracing means secured between at least one of the top and bottom frames and the post structures at opposite ends of the respective tunnel side frame to maintain the tunnel side frame in a rigid rectangular shape while said crabpot is in its erect configuration, said bracing means including locking means at each post structure comprising a member extending along the post structure and a slidable means carried by the post structure for releasably anchoring said member to the respective post structure in the erect position of the crabpot structure to lock said crabpot structure in its erect position, said members being releasable from the respective post structures to release said bracing means by slidable movement of the slidable means to enable said tunnel side frames to change shape and permit the crabpot structure to assume its collapsed configuration.

11. A collapsible crabpot structure according to claim 10 wherein each said member extends parallel to the post structure and is anchored thereto in the erect position of the structure by slideable means in the form of a slidable sleeve tightly encircling said parallel member and the respective post structure.

12. A collapsible crabpot structure according to claim 11 wherein each releasable bracing means comprises an inverted V-shaped structure having two arms with means pivotably connecting its vertex to said top frame, and wherein said locking means includes such a slidable sleeve for securing the other end of each arm of the V-shaped structure to a respective post structure.

13. A collapsible crabpot structure according to claim 10 wherein each of said four side frames includes a V-shaped structure extending thereacross in the erect position of the crabpot to define multiple triangular structures in each side frame for strengthening the latter.

14. A collapsible crabpot structure according to claim 13 wherein said V-shaped structure at the door side frame includes a tubular member pivotably mounted on a portion of the top frame and has downwardly extending legs secured to respective post structures at opposite ends of the door side frame, said legs having further extensions extending downwardly and inwardly and connected to movable portions of the hinge means at the door side frame.

15. A collapsible crabpot structure according to claim 13 wherein said V-shaped structure at the lifting side frame includes a tubular member pivotably mounted on a portion of the bottom frame and has upwardly extending legs secured to respective post structures at opposite ends of the lifting side frame, said legs having further extensions extending upwardly and inwardly and connected to movable portions of the hinge means at the lifting side frame.

16. A collapsible crabpot structure according to claim 13 wherein each of said hinge means comprises a tubular member having a horizontal axis and within which is rotatably received a portion of one of the top and bottom frames.

17. A collapsible crabpot structure according to claim 16 wherein each said tubular member is an elongated tube extending perpendicular to a respective post structure and including bracing means between the tube and the respective post structure to reinforce the hinge means to prevent movement of the top frame transversely of its direction of collapsing movement.

18. A collapsible crabpot frame comprising:
a generally flat bottom frame structure for resting on a seabed,
said bottom frame structure including a plurality of parallel bar hinge members,
said collapsible crabpot frame having a folding structure means including a plurality of hinged bar members each extending generally perpendicular to one of the parallel bar hinge members of the bottom frame structure,
hinge means for pivotably connecting each hinged bar member to its respective bottom frame bar member,
said folding structure means forming with said bottom frame structure four frame sides comprising a door side frame, a lifting side frame and opposite tunnel side frames,
each said hinge means comprising a tube member with the respective hinged bar member being secured thereto, said tube member being rotatably carried by a respective bottom frame bar member,
said hinge means being located at outer corners of the bottom frame structure,
said bottom frame comprising a one-piece bar bent to form bottom frame members of said tunnel side frames and an X-shaped structure extending across the center of the bottom frame,
said bottom frame including two elongated parallel bars extending across front and rear portions of the one-piece bar to form bottom frame members of the door and lifting side frames.

19. A collapsible crabpot frame according to claim 18 wherein the ends of said elongated parallel bars form such parallel bar hinge members.

20. A collapsible crabpot frame according to claim 19 wherein said folding structure means includes a flat top frame structure comprising two parallel top frame members forming the tops of the tunnel side frames,
said top frame structure further including two elongated top frame bars connected to and perpendicular to said top frame members and forming the tops of the door and lifting side frames,
the ends of said elongated top frame bars also forming such parallel bar hinge members.

* * * * *